(12) United States Patent
Lee et al.

(10) Patent No.: US 7,271,562 B2
(45) Date of Patent: Sep. 18, 2007

(54) METHOD AND DEVICE FOR CONTROLLING STARTUP OF MOTOR

(75) Inventors: Gil-su Lee, Seoul (KR); Dal-ho Cheong, Seoul (KR); Kyung-hoon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 136 days.

(21) Appl. No.: 11/268,511

(22) Filed: Nov. 8, 2005

(65) Prior Publication Data
US 2006/0119305 A1   Jun. 8, 2006

(30) Foreign Application Priority Data
Dec. 6, 2004   (KR) ............. 10-2004-0101840

(51) Int. Cl.
*G05B 11/36* (2006.01)
(52) U.S. Cl. .............. 318/609; 318/432; 318/434
(58) Field of Classification Search .............. None
See application file for complete search history.

(56) References Cited

U.S. PATENT DOCUMENTS 6,137,258 A * 10/2000 Jansen ............ 318/802
6,639,380 B2 * 10/2003 Sul et al. ............ 318/727

* cited by examiner

*Primary Examiner*—Lincoln Donovan
*Assistant Examiner*—Erick Glass
(74) *Attorney, Agent, or Firm*—Birch, Stewart, Kolasch & Birch, LLP

(57) ABSTRACT

Disclosed is a method and device for controlling the startup of a synchronous reluctance motor. The device includes: a voltage injector which generates injection voltages to estimate an initial position of the rotor; a motor drive voltage generator which converts stationary-coordinate-system voltages including the injection voltages to three-phase motor drive voltages and applies the three-phase motor drive voltages to the motor; a current extractor which extracts response current components $i_{\alpha\text{-}inj}$, $i_{\beta\text{-}inj}$ in respect to the injection voltages from two-phase stationary-coordinate-system currents converted from three-phase currents detected upon rotation of the motor; and a position/speed estimator which extracts response current components related to a rotor position from the response current components $i_{\alpha\text{-}inj}$, $i_{\beta\text{-}inj}$ in respect to the injection voltages to calculate a rotor position error (e), and estimates the speed and position $\tilde{\omega}, \tilde{\theta}$ of the rotor from the calculated rotor position error (e).

19 Claims, 5 Drawing Sheets

METHOD AND DEVICE FOR CONTROLLING STARTUP OF MOTOR

BACKGROUND OF THE INVENTION

This application claims the priority of Korean Patent Application No. 2004-101840, filed on Dec. 6, 2004, in the Korean Intellectual Property Office, the disclosure of which is incorporated herein in its entirety by reference.

1. Field of the Invention

The present invention relates to a method and device for controlling a motor and, more particularly, to a method and device for controlling the startup of a synchronous reluctance motor.

2. Description of Related Art

A synchronous reluctance motor implies one configured such that a driving source of a rotor is synchronous with that of a stator and the rotor rotates so that a resistance created in the rotor can be minimized when a current flows into the stator. To drive such a synchronous reluctance motor, the position of the rotor should be known. The position of the rotor can be directly detected by use of a rotor-position detector, such as an encoder. However, the rotor position detector can not be used in a compressor for a refrigerator or air-conditioner since the internal temperature of the compressor is extremely high. Thus, the synchronous reluctance motor for the compressor is controlled by means of a sensorless control scheme.

A typical sensorless control system will now be described in detail with reference to FIG. 1. The sensorless control system includes a reference torque current generator 10, a rotating-coordinate-system voltage generator 20, a stationary-coordinate-system voltage generator 30, a motor drive voltage generator 40, and a coordinate system converter 50. The reference torque current generator 10 generates a reference torque current $i^*_q$ for compensating an error caused by a difference between a reference speed $\omega^*$, also called an instruction speed, and an estimated rotor speed $\hat{\omega}$. The rotating-coordinate-system voltage generator 20 generates a reference torque voltage $v^*_q$ for compensating an error caused by a difference between the reference torque current $i^*_q$ and an actual torque current $i_q$, and a reference flux voltage $v^*_d$ for compensating an error caused by a difference between a reference flux $\lambda^*_d$ and an observed flux $\hat{\lambda}_d$. The stationary-coordinate-system voltage generator 30 converts the reference torque voltage $v^*_q$ and the reference flux voltage $v^*_d$, both of which are the rotating-coordinate-system voltages, into stationary-coordinate-system voltages $v^*_\alpha, v^*_\beta$. The motor drive voltage generator 40 converts the stationary-coordinate-system voltages as $v^*_\alpha, v^*_\beta$ to three-phase voltages $v_U, v_V, v_W$ by means of a space-voltage vector pulse width modulation (SVPWM) and then applies the three-phase voltages to the synchronous reluctance motor (SynRM motor). The coordinate system converter 50 converts three-phase currents $i_U, i_V$ detected upon rotation of the synchronous reluctance motor to stationary-coordinate-system currents $i_\alpha, i_\beta$ and in turn converts the stationary-coordinate-system currents $i_\alpha, i_\beta$ to rotating-coordinate-system currents $i_d, i_q$.

In addition, the sensorless control system further includes a flux observing unit 60 for outputting an observed flux $\hat{\lambda}_{\alpha\beta}$ on $\alpha$-axis and $\beta$-axis of the stationary coordinate system of the motor, an estimated flux $\tilde{\lambda}_{dq}$ on d-axis and q-axis of the rotating coordinate system and an observed flux $\hat{\lambda}_q$ on q-axis of the rotating coordinate system from stationary-coordinate-system voltages $v_\alpha, v_\beta$ and stationary-coordinate-system currents $i_\alpha, i_\beta$ inputted to the motor.

For reference, the observed flux $\hat{\lambda}_{\alpha\beta}$ and the estimated flux $\tilde{\lambda}_{dq}$ are calculated from the following Equations 1 and 2 using detected voltage $v_{\alpha\beta}$ and currents $i_{\alpha\beta}, i_{dq}$, predetermined resistance R in a stator coil, and a magnetic model.

$$\tilde{\lambda}_{dq} = L(i_{dq}) \quad \text{[Equation 1]}$$

$$\hat{\lambda}_{\alpha\beta} = \frac{s}{s+g}\left(\frac{v_{\alpha\beta} - R_s i_{\alpha\beta}}{s}\right) + \frac{g}{s+g}\tilde{\lambda}_{\alpha\beta} \quad \text{[Equation 2]}$$

In addition, the sensorless control system further includes a position/speed estimator 70 for estimating a rotating angle $\tilde{\theta}$ of the motor's rotor from the observed flux $\hat{\lambda}_{\alpha\beta}, \hat{\lambda}_q$ and the estimated flux $\tilde{\lambda}_{dq}$, which are outputted from the flux observing unit 60, based on a predetermined equation, and for estimating a rotor speed $\hat{\omega}$ from the estimated rotating angle $\tilde{\theta}$.

The sensorless control system incorporated in the synchronous reluctance motor uses a startup-through-signal-injection algorithm at an initial startup time (i.e., an interval from halt of the rotor to low speed of the rotor) when input/output information is weak. For this, a typical sensorless control system further includes a d-axis flux injector 80. The d-axis flux injector 80 is used for generating and injecting a small-sized excitation signal $\lambda^*_{d-inj}$ necessary for estimating the position of the rotor.

In the sensorless control system thus configured, the observed flux $\hat{\lambda}_{\alpha\beta}$ and the estimated flux $\tilde{\lambda}_{dq}$ are to be obtained to estimate the position of the rotor. For this, the resistance $R_s$ of the stator coil and the magnetic model $\tilde{\lambda}_{dq}=L(i_{dq})$ are to be specified in advance. These motor constants are specified through a prearranged experiment or simulation.

Accordingly, when the specification of the synchronous reluctance motor has changed, the resistance $R_s$ of the stator and the magnetic model should be newly obtained through an experiment or simulation. Further, there is a problem in that the obtained values are applied to a startup algorithm so that the motor should be controlled through a new startup algorithm.

SUMMARY OF THE INVENTION

The present invention provides a method and device for controlling the startup of a synchronous reluctance motor by estimating the position and speed of a rotor without the need to use motor constants.

The present invention further provides a method and device for controlling the startup of a synchronous reluctance motor through the same algorithm without an extra experiment or simulation even though the specification of the synchronous reluctance motor has changed.

According to an aspect of the present invention, there is provided a device for controlling the startup of a motor according to a sensorless control scheme in which estimated position and speed of a rotor is used to control the motor, the device including: a voltage injector which generates injection voltages to estimate an initial position of the rotor; a motor drive voltage generator which converts stationary-coordinate-system voltages including the injection voltages to three-phase motor drive voltages and applies the three-phase motor drive voltages to the motor; a current extractor which extracts response current components $i_{\alpha-inj}, i_{\beta-inj}$ in respect to the injection voltages from two-phase stationary-coordinate-system currents converted from three-phase currents detected upon rotation of the motor; and a position/speed estimator which extracts response current components related to a rotor position from the response current components $i_{\alpha\text{-}inj}, i_{\beta\text{-}inj}$ in respect to the injection voltages to calculate a rotor position error (e), and estimates the speed and position $\tilde{\omega}, \tilde{\theta}$ of the rotor from the calculated rotor position error (e).

The device may further include a first coordinate converter which first eliminates the current components in respect to the injection voltages from the two-phase stationary-coordinate-system currents and then converts them to rotating-coordinate-system currents, where the first coordinate converter includes a notch filter.

The position/speed estimator may include: a third coordinate converter which converts the response current components $i_{\alpha\text{-}inj}$, $i_{\beta\text{-}inj}$ in respect to the injection voltages to rotating-coordinate-system response current components $i_{hd}, i_{hq}$ using a rotating angle $\theta_h$ of the rotor in respect to the injection voltages; a plurality of high-pass filters which extracts response current components $i_{hd\text{-}hp}, i_{hq\text{-}hp}$ related to the rotor position from the rotating-coordinate-system response current components $i_{hd}, i_{hq}$; a fourth coordinate converter which converts the response current components $i_{hd\text{-}hp}, i_{hq\text{-}hp}$ related to the rotor position to stationary-coordinate-system response current components $i_{h\alpha}, i_{h\beta}$ using the gain-controlled rotating angle $\theta_h$; a position error calculator which calculates the rotating-coordinate-system response current components $i_{h\alpha}, i_{h\beta}$ and an estimated rotor position $\tilde{\theta}$ based on the following equation to calculate a rotor position error (e); a PI regulator which estimates the rotor speed $\tilde{\omega}$ through proportional integral of the rotor position error (e); and an integrator which integrates the estimated rotor speed $\tilde{\omega}$ to estimate the rotor position $\tilde{\theta}$, $$e = i_{h\alpha} \sin 2\tilde{\theta} - i_{h\beta} \cos 2\tilde{\theta}$$

According to another aspect of the present invention, there is provided a device for controlling the startup of a motor according to a sensorless control scheme in which estimated position and speed of a rotor is used to control the motor, the device comprising: a motor drive voltage generator which generates voltage to drive the motor; a voltage injector which generates injection voltages for estimating an initial position of the rotor; a current extractor which extracts response current components in respect to the injection voltages; a position/speed estimator which estimates the position and speed of the rotor based on the response current components outputted from the current extractor; and a coordinate converter which converts three-phase currents detected upon rotation of the motor to rotating-coordinate-system currents using the estimated rotor position.

According to the present invention, it is possible to estimate the position and speed of the rotor by calculating the rotor position error (e) from the response current in respect to the injection voltage without motor constants such as a stator resistance and a magnetic model. Accordingly, it is possible to apply the same position/speed estimation algorithm without regard to any change in the motor specification.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings. In the following description, a detailed description of well-known functions and configurations incorporated herein will be omitted when it may make the subject matter of the present invention rather unclear.

Figure 1:
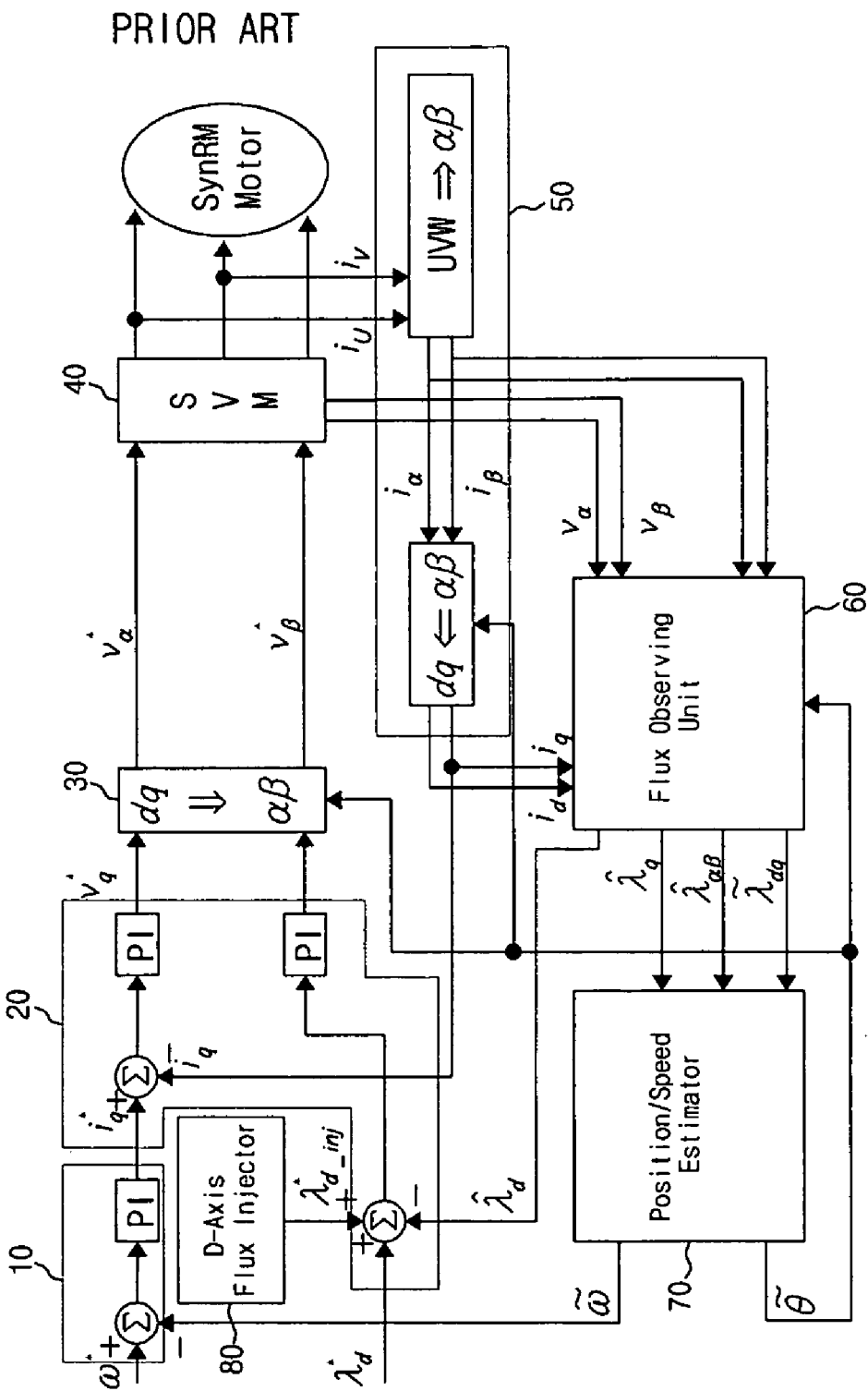
FIG. 1 is a block diagram showing a sensorless control system for a synchronous reluctance motor.
Figure 2:
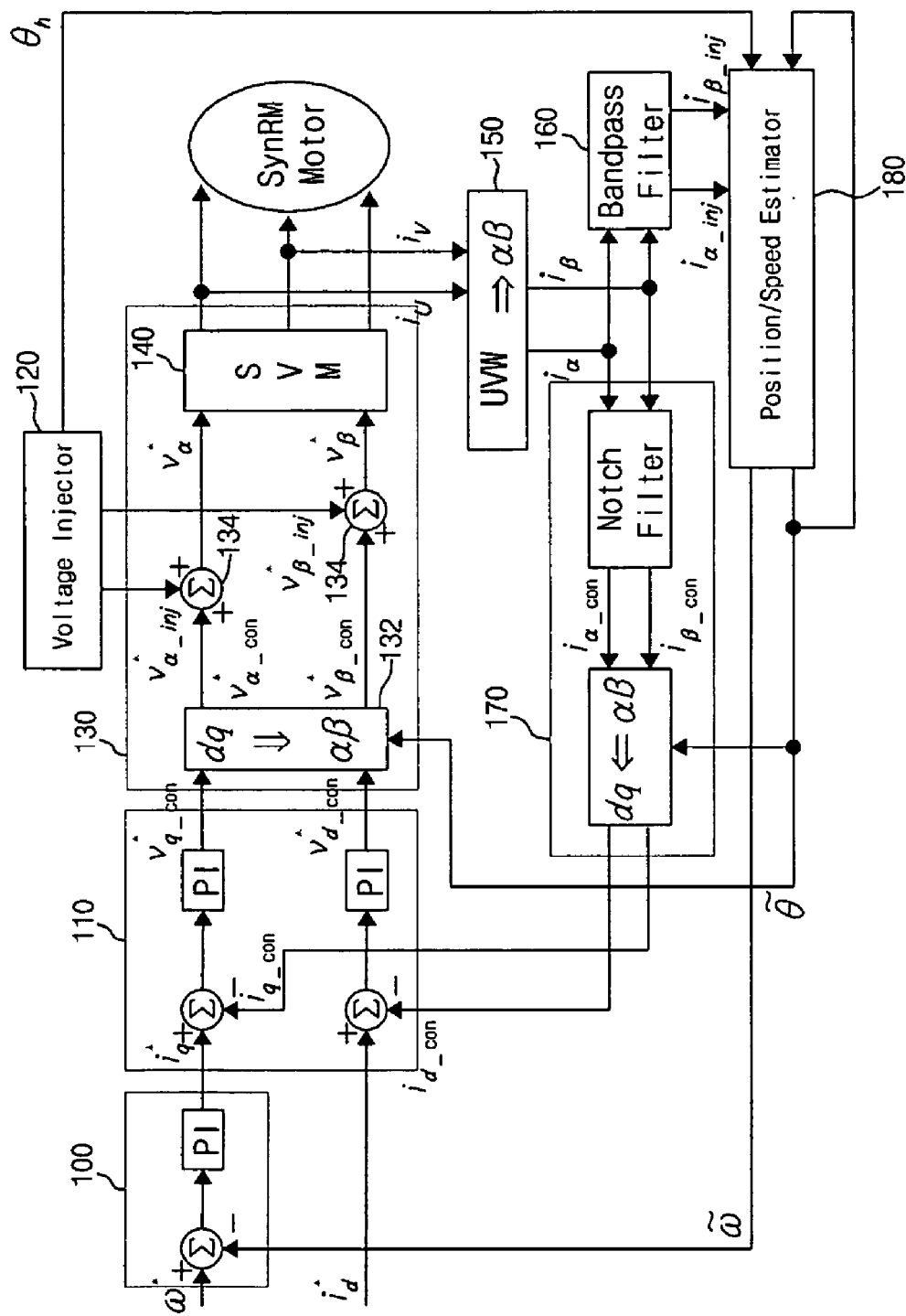
FIG. 2 is a block diagram showing a construction of a sensorless control system equipped with a device for controlling the startup of a motor in accordance with an embodiment of the present invention.
Figure 3:
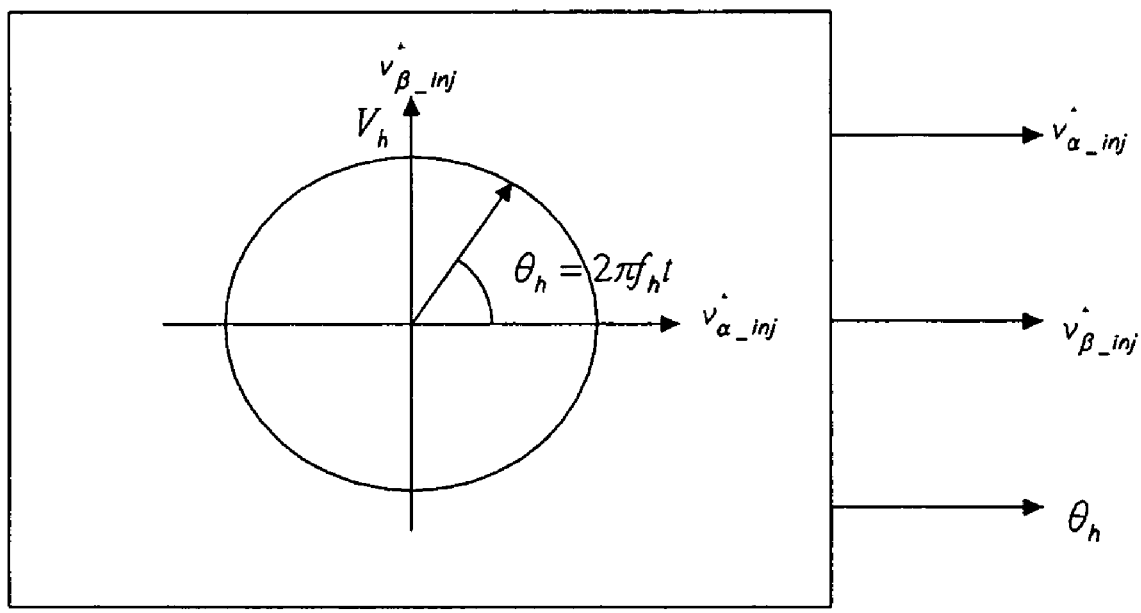
FIG. 3 is a view showing an output characteristic of a voltage injector shown in FIG. 2.
Figure 4:
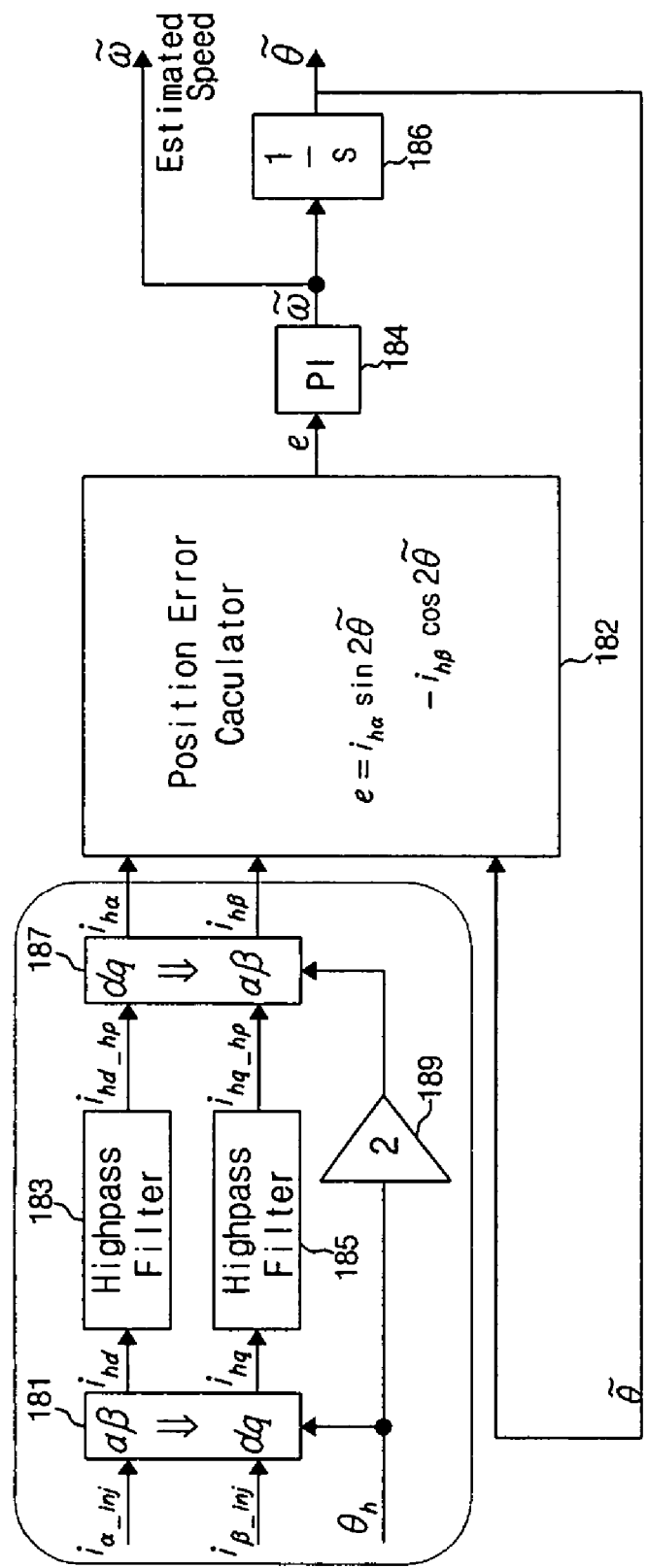
FIG. 4 is a view showing a detailed construction of a position/speed estimator shown in FIG. 2.

FIG. 2 is a block diagram showing a construction of a sensorless control system equipped with a device for controlling the startup of a motor in accordance with an embodiment of the present invention. FIG. 3 is a view showing an output characteristic of a voltage injector shown in FIG. 2. FIG. 4 is a view showing a detailed construction of a position/speed estimator shown in FIG. 2.

Referring to FIG. 2, the sensorless control system equipped with a device for controlling the startup of a motor in accordance with an embodiment of the present invention basically includes a reference torque current generator 100 which generates a reference torque current $i^*_q$ for compensating an error caused by a difference between a reference speed $\omega^*$, also called an instruction speed, and an estimated rotor speed $\tilde{\omega}$; and a rotating-coordinate-system voltage generator 110 which generates a reference torque voltage $v^*_{q\text{-}con}$ for compensating an error caused by a difference between the reference torque current $i^*_q$ and an actual torque current $i_{q\text{-}con}$, and a reference flux voltage $v^*_{d\text{-}con}$ for compensating an error caused by a difference between a reference flux current $v^*_d$ and an actual flux current $i_{d\text{-}con}$.

The sensorless control system further includes a voltage injector 120 which generates injection voltages for estimating an initial position of the rotor. As shown in FIG. 3, the voltage injector 120 outputs injection voltages $v^*_{\alpha\text{-}inj}, v^*_{\beta\text{-}inj}$ on a stationary coordinate system which is represented in $\alpha$-axis voltage and $\beta$-axis voltage. For reference, in FIG. 3, $\theta_h$ denotes a rotating angle in respect to the injection voltage and can be represented by $2\pi f_h t$. Here, $f_h$ denotes a frequency of the injection voltage.

Turning back to FIG. 2, the sensorless control system includes a motor drive voltage generator 130. The motor drive voltage generator 130 converts the stationary-coordinate-system voltages $v^*_\alpha, v^*_\beta$ containing the injection voltages $v^*_{\alpha\text{-}inj}, v^*_{\beta\text{-}inj}$ to three-phase motor drive voltages $v_U, v_V, v_W$ and applies the three-phase motor drive voltages to the motor (SynRM). For this, the motor drive voltage generator 130 includes a second coordinate converter 132 for converting the reference torque voltage $v^*_{q\text{-}con}$ and the reference flux voltage $v^*_{d\text{-}con}$, both of which are the rotating-coordinate-system voltages, to the stationary-coordinate-system voltages $v^*_{\alpha\text{-}con}, v^*_{\beta\text{-}con}$; an adder 134 for adding the injection voltages $v^*_{\alpha\text{-}inj}, v^*_{\beta\text{-}inj}$ to the stationary-coordinate-system voltages $v^*_{\alpha\text{-}con}, v^*_{\beta\text{-}con}$ which are outputs of the second coordinate converter 132; and a motor driving unit 140 for converting the stationary-coordinate-system voltages $v^*_\alpha, v_\beta$ containing the injection voltages through space vector modulation (SVM) to generate the three-phase motor drive voltages. The motor driving unit includes a typical inverter.

The sensorless control system in accordance with an embodiment of the present invention further comprises a three-phase/stationary coordinate converter 150 for converting three-phase currents $i_U, i_V$ detected upon rotation of the motor to two-phase stationary-coordinate-system currents $i_\alpha, i_\beta$; and a current extractor 160 for extracting response currents $i_{\alpha\text{-}inj}, i_{\beta\text{-}inj}$ corresponding to the injection voltages $v^*_{\alpha\text{-}inj}, v^*_{\beta\text{-}inj}$ from the two-phase stationary-coordinate-system currents as $i_\alpha, i_\beta$. The current extractor 160 can be implemented with a bandpass filter for extracting current components corresponding to the injection voltages.

The two-phase stationary-coordinate-system currents $i_\alpha, i_\beta$ include response currents $i_{\alpha\text{-}con}, i_{\beta\text{-}con}$ corresponding to the stationary-coordinate-system control voltages $v^*_{\alpha\text{-}con}, v^*_{\beta\text{-}con}$. The response currents $i_{\alpha\text{-}con}, i_{\beta\text{-}con}$ are necessary to generate an actual torque current $i_{q\text{-}con}$ and an actual flux current $i_{d\text{-}con}$. Accordingly, the sensorless control system in accordance with an embodiment of the present invention further includes a first coordinate converter 170 for removing the current components corresponding to the injection voltages from the two-phase stationary-coordinate-system currents $i_\alpha, i_\beta$ and then converting them to the rotating-coordinate-system currents $i_{q\text{-}con}, i_{d\text{-}con}$ using an estimated rotor position $\tilde{\theta}$. The first coordinate converter 170 includes a notch filter to eliminate the current components corresponding to the injection voltages.

Finally, the sensorless control system further includes a position/speed estimator 180 for extracting response currents related to the position of the rotor from the response currents $i_{\alpha\text{-}inj}, i_{\beta\text{-}inj}$ corresponding to the injection voltages extracted in the current extractor 160 to calculate a rotor position error (e) and estimating the speed and position $\tilde{\omega}, \tilde{\theta}$ of the rotor from the calculated rotor position error (e).

As shown in FIG. 4, the position/speed estimator 180 comprises: a third coordinate converter 181 for converting the response currents $i_{\alpha\text{-}inj}, i_{\beta\text{-}inj}$ corresponding to the injection voltages into rotating-coordinate-system response currents $i_{hd}, i_{hq}$ using the rotating angle $\theta_h$ in respect to the injection voltages; high-pass filters 183 and 185 for extracting response currents $i_{hd\text{-}hp}, i_{hq\text{-}hp}$ related to the position of the rotor from the rotating-coordinate-system response currents $i_{hd}, i_{hq}$; a fourth coordinate converter 187 for converting the response currents $i_{hd\text{-}hp}, i_{hq\text{-}hp}$ related to the position of the rotor to the stationary-coordinate-system response currents $i_{h\alpha}, i_{h\beta}$ using the gain-controlled rotating angle $\theta_h$; a position error calculator 182 for calculating a rotor position error (e) by calculating the stationary-coordinate-system response currents $i_{h\alpha}, i_{h\beta}$ and an estimated rotor position $\tilde{\theta}$ based on the following Equation 3; a PI regulator 184 for estimating the rotor speed $\tilde{\omega}$ through proportional integral of the rotor position error (e); and an integrator 186 for integrating the estimated rotor speed $\tilde{\omega}$ to estimate the rotor position $\tilde{\theta}$.

$$e = i_{h\alpha} \sin 2\tilde{\theta} - i_{h\beta} \cos 2\tilde{\theta} \qquad \text{[Equation 3]}$$

Figure 5:
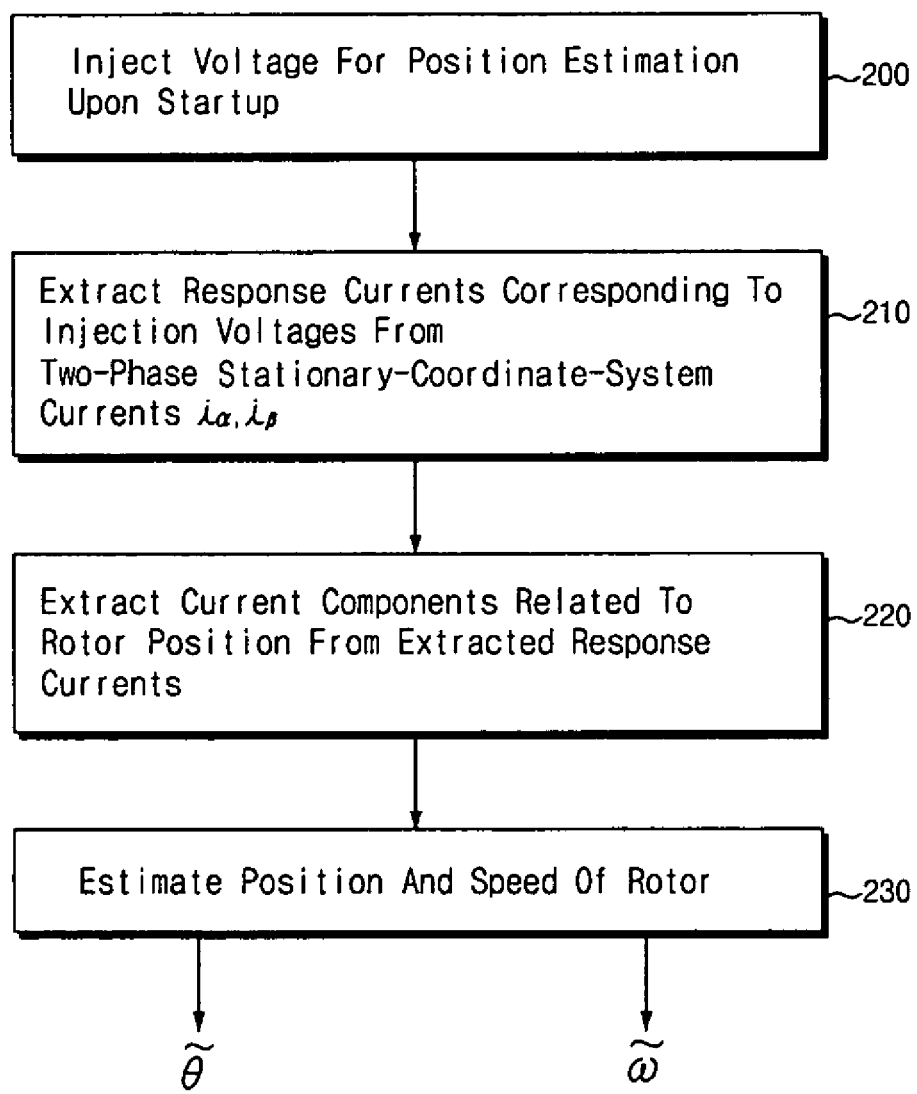
FIG. 5 is a flow chart showing an estimation of the position and speed of a rotor incorporated in a device for controlling the startup of a motor in accordance with an embodiment of the present invention.

A detailed description will now be given of a process of estimating the position and speed of the rotor in the sensorless control system having the above-mentioned construction with reference to FIG. 5.

First, the voltage injector 120 generates and outputs injection voltages $v^*_{\alpha\text{-}inj}, v^*_{\beta\text{-}inj}$ on the stationary coordinate system as an excitation signal for estimating an initial position of the rotor (step 200). The injection voltages $v^*_{\alpha\text{-}inj}, v^*_{\beta\text{-}inj}$ are applied to the adder 134 to be added to the stationary-coordinate-system control voltages $v^*_{\alpha\text{-}con}, v^*_{\beta\text{-}con}$ outputted from the second coordinate converter 132. Resultant voltages are applied to the motor driving unit 140 so that three-phase motor drive voltages converted through the space vector modulation are applied to asynchronous reluctance motor.

When the motor is rotated by the three-phase motor drive voltage, the three-phase/stationary coordinate converter 150 converts the three-phase currents $i_U, i_V$ detected upon rotation of the motor to the two-phase stationary-coordinate-system currents $i_\alpha, i_\beta$. The two-phase stationary-coordinate-system currents $i_\alpha, i_\beta$ are applied to the bandpass filter, which is the current extractor 160, and a notch filter in the first coordinate converter 170. For reference, the two-phase stationary-coordinate-system currents $i_\alpha, i_\beta$ include the response currents $i_{\alpha\text{-}inj}, i_{\beta\text{-}inj}$ in respect to the injection voltages $v^*_{\alpha\text{-}inj}, v^*_{\beta\text{-}inj}$ and the response currents $i_{\alpha\text{-}con}, i_{\beta\text{-}con}$ in respect to the control voltages.

Accordingly, since the current components in respect to the injection voltages are eliminated by the notch filter, only the response currents $i_{\alpha\text{-}con}, i_{\beta\text{-}con}$ in respect to the stationary-coordinate-system control voltages $v^*_{\alpha\text{-}con}, v^*_{\beta\text{-}con}$ are applied to a stationary/rotating coordinate converter in the first coordinate converter 170 and converted to an actual torque current $i_{q\text{-}con}$ and an actual flux current $i_{d\text{-}con}$. As described above, the torque current and the flux current are values used for generating a torque voltage and a flux voltage on a feedback loop.

Meanwhile, only the response current components $i_{\alpha\text{-}inj}, i_{\beta\text{-}inj}$ in respect to the injection voltages $v^*_{\alpha\text{-}inj}, v^*_{\beta\text{-}inj}$ passes through the bandpass filter, which is the current extractor 160, among the applied two-phase stationary-coordinate-system currents $i_\alpha, i_\beta$, since the bandpass filter is set such that only the response current components $i_{\alpha\text{-}inj}, i_{\beta\text{-}inj}$ in respect to the injection voltages $v^*_{\alpha\text{-}inj}, v^*_{\beta\text{-}inj}$ can be passed. That is, the response current components $i_{\alpha\text{-}inj}, i_{\beta\text{-}inj}$ in respect to the injection voltages $v^*_{\alpha\text{-}inj}, v^*_{\beta\text{-}inj}$ can be extracted by the bandpass filter (step 210). The response current components are expressed in the following Equation 4.

$$i_{\alpha\text{-}inj} = A \cos(2\pi f_h t) - B \cos(2\theta - 2\pi f_h t)$$

$$i_{\beta\text{-}inj} = A \sin(2\pi f_h t) - B \sin(2\theta - 2\pi f_h t) \qquad \text{[Equation 4.]}$$

In Equation 4, A and B are constants related to motor constants, $f_h$ denotes the frequency of the injection voltage, and t denotes a time interval. In Equation 4, terms unrelated to the position $\theta$ of the rotor are not necessary in estimating the position and speed of the rotor. Accordingly, it is necessary to remove the terms and extract only current components related to the position of the rotor. A description will now be given of a process (step 220) of extracting only the current components related to the position of the rotor from the response currents extracted through the bandpass filter 160 with reference to FIG. 4.

If the response current components $i_{\alpha\text{-}inj}, i_{\beta\text{-}inj}$ in respect to the injection voltages are converted to the rotating-coordinate-system response current components $i_{hd}, i_{hq}$ using a rotating angle $\theta_h$ in respect to the injection voltages, terms unrelated to the position of the rotor are converted to a constant (DC) as shown in the following Equation 5.

$$i_{hd}=A*1-B\cos(2\theta-2\pi f_h t),$$

$$i_{hq}=A*0-B\sin(2\theta-2\pi f_h t) \quad \text{[Equation 5]}$$

Accordingly, if the rotating-coordinate-system response currents $i_{hd}, i_{hq}$ expressed in Equation 5 are subjected to the high-pass filtering process, DC components unrelated to the position of the rotor are removed and only the response current components $i_{hd-hp}, i_{hq-hp}$ related to the position of the rotor can be extracted as shown in Equation 6.

$$i_{hd-hp}=-B\cos(2\theta-2\pi f_h t),$$

$$i_{hq-hp}=-B\sin(2\theta-2\pi f_h t) \quad \text{[Equation 6]}$$

To leave terms expressed in a trigonometric function among the response current components $i_{hd-hp}, i_{hq-hp}$ related to the position of the rotor, the response current components $i_{hd-hp}, i_{hq-hp}$ related to the position of the rotor are converted by means of the fourth coordinate converter 187 to the stationary-coordinate-system response current components $i_{h\alpha}, i_{h\beta}$ using the rotating angle $2\theta_h$ which is gain-controlled (×2) in a gain amplifier 189, thereby obtaining current components related to the position of the rotor as shown in the following Equation 7.

$$i_{h\alpha}=-B\cos(2\theta),$$

$$i_{h\beta}=-B\sin(2\theta) \quad \text{[Equation 7]}$$

Meanwhile, after the response current components $i_{h\alpha}, i_{h\beta}$ on the stationary coordinate system, which are related to the rotor position, are obtained through the above-mentioned process, the position/speed estimator 180 calculates a rotor position error (e) from the response current components, estimates and outputs the speed and position $\omega, \theta$ of the rotor from the calculated rotor position error (e) (step 230).

That is, the position error calculator 182 in the position/speed estimator 180 calculates and outputs the rotor position error (e) by calculating the stationary-coordinate-system response current components $i_{h\alpha}, i_{h\beta}$ and the estimated rotor position $\tilde{\theta}$ fed back based on the following Equation 8.

$$e=i_{h\alpha}\sin 2\tilde{\theta}-i_{h\beta}\cos 2\tilde{\theta}=B\sin(\theta-\tilde{\theta})=B*(\theta-\tilde{\theta}) \quad \text{[Equation 8]}$$

According to Equation 8, it can be seen that information proportional to the rotor position error can be obtained from the response currents $i_{\alpha-inj}, i_{\beta-inj}$ in respect to the injection voltages.

That is, if an error between the estimated position and actual position of the rotor is obtained by the position error calculator 182, the rotor speed $\tilde{\omega}$ can be estimated using the PI regulator 184 and the rotor position $\tilde{\theta}$ according to the estimated rotor speed $\tilde{\omega}$ can be estimated through the integrator 186.

For reference, the estimated rotor speed $\tilde{\omega}$ is fed back to control the motor speed as in a typical sensorless control system. The estimated rotor position $\tilde{\theta}$ is used for phase-conversion of voltage and current necessary for vector control and the calculation of a position error in the following sampling period.

According to the above-mentioned embodiments of the present invention, it is possible to obtain information proportional to the position error of the rotor from the response currents $i_{\alpha-inj}, i_{\beta-inj}$ in respect to the injection voltages upon startup of the synchronous reluctance motor. Accordingly, the present invention can estimate the position and speed of the rotor without motor constants such as a stator resistance and a magnetic model.

As apparent from the above description, in a sensorless vector control system of a synchronous reluctance motor, the present invention can calculate the rotor position error (e) from the response current in respect to the injection voltage without motor constants such as a stator resistance and a magnetic model and estimate the position and speed of the rotor. Accordingly, it is possible to apply the same position/speed estimation algorithm without regard to any change in the motor specification.

Further, the present invention is advantageous in that despite any change in the specification of the synchronous reluctance motor, extra experiments or simulations are not necessary to obtain motor constants such as a stator resistance and a magnetic model.

While the present invention has been described with reference to exemplary embodiments thereof, it will be understood by those skilled in the art that various changes in form and details may be made therein without departing from the scope of the present invention as defined by the following claims.

What is claimed is:

1. A device for controlling the startup of a motor according to a sensorless control scheme in which estimated position and speed of a rotor is used to control the motor, the device comprising:

a voltage injector which generates injection voltages to estimate an initial position of the rotor;

a motor drive voltage generator which converts stationary-coordinate-system voltages including the injection voltages to three-phase motor drive voltages and applies the three-phase motor drive voltages to the motor;

a current extractor which extracts response current components $i_{\alpha-inj}, i_{\beta-inj}$ in respect to the injection voltages from two-phase stationary-coordinate-system currents converted from three-phase currents detected upon rotation of the motor; and a position/speed estimator which extracts response current components related to a rotor position from the response current components $i_{\alpha-inj}, i_{\beta-inj}$ in respect to the injection voltages to calculate a rotor position error (e), and estimates the speed and position $\omega, \theta$ of the rotor from the calculated rotor position error (e).

2. The device of claim 1, wherein the motor drive voltage generator comprises:

a second coordinate converter for converting a reference torque voltage $v^*_{q-con}$ and a reference flux voltage $v^*_{d-con}$, both of which are rotating-coordinate-system voltages, to stationary-coordinate-system voltages $v^*_{\alpha-con}, v^*_{\beta-con}$;

a plurality of adders each adding the injection voltages $v^*_{\alpha-inj}, v^*_{\beta-con}$ to the stationary-coordinate-system voltages $v^*_{\alpha-con}, v^*_{\beta-con}$; and a motor driving unit for converting stationary-coordinate-system voltages $v^*_\alpha, v^*_\beta$ including the injection voltages to the three-phase motor drive voltages.

3. The device of claim 1, wherein the current extractor is a bandpass filter which extracts current components $i_{\alpha-inj}, i_{\beta-inj}$ in respect to the injection voltages.

4. The device of claim 1, wherein the position/speed estimator comprises:

a third coordinate converter which converts the response current components $i_{\alpha-inj}, i_{\beta-inj}$ in respect to the injection voltages to rotating-coordinate-system response current components $i_{hd}, i_{hq}$ using a rotating angle $\theta_h$ of the rotor in respect to the injection voltages;

a plurality of high-pass filters which extracts response current components $i_{hd\text{-}hp}, i_{hq\text{-}hp}$ related to the rotor position from the rotating-coordinate-system response current components $i_{hd}, i_{hq}$;

a fourth coordinate converter which converts the response current components $i_{hd\text{-}hp}, i_{hq\text{-}hp}$ related to the rotor position to stationary-coordinate-system response current components $i_{h\alpha}, i_{h\beta}$ using the gain-controlled rotating angle $\theta_h$;

a position error calculator which calculates the rotating-coordinate-system response current components $i_{h\alpha}, i_{h\beta}$ and an estimated rotor position $\tilde{\theta}$ based on the following equation to calculate a rotor position error (e);

a PI regulator which estimates the rotor speed $\tilde{\omega}$ through proportional integral of the rotor position error (e); and an integrator which integrates the estimated rotor speed $\tilde{\omega}$ to estimate the rotor position $\tilde{\theta}$, $$e = i_{h\alpha} \sin 2\tilde{\theta} - i_{h\beta} \cos 2\tilde{\theta}$$

$$i_{h\alpha} = -B \cos(2\theta),$$

$$i_{h\beta} = -B \sin(2\theta).$$

5. The device of claim 1 further comprising a first coordinate converter which first eliminates the current components in respect to the injection voltages from the two-phase stationary-coordinate-system currents and then converts them to rotating-coordinate-system currents, wherein the first coordinate converter includes a notch filter.

6. The device of claim 5, wherein the motor drive voltage generator comprises:

a second coordinate converter for converting a reference torque voltage $v^*_{q\text{-}con}$ and a reference flux voltage $v^*_{d\text{-}con}$, both of which are rotating-coordinate-system voltages, to stationary-coordinate-system voltages $v^*_{\alpha\text{-}con}, v^*_{\beta\text{-}con}$;

a plurality of adders each adding the injection voltages $v^*_{\alpha\text{-}inj}, v^*_{\beta\text{-}inj}$ to the stationary-coordinate-system voltages $v^*_{\alpha\text{-}con}, v^*_{\beta\text{-}con}$; and a motor driving unit for converting stationary-coordinate-system voltages $v^*_\alpha, v^*_\beta$ including the injection voltages to the three-phase motor drive voltages.

7. The device of claim 5, wherein the current extractor is a bandpass filter which extracts current components $i_{\alpha\text{-}inj}, i_{\beta\text{-}inj}$ in respect to the injection voltages.

8. The device of claim 5, wherein the position/speed estimator comprises:

a third coordinate converter which converts the response current components $i_{\alpha\text{-}inj}, i_{\beta\text{-}inj}$ in respect to the injection voltages to rotating-coordinate-system response current components $i_{hd}, i_{hq}$ using a rotating angle $\theta_h$ of the rotor in respect to the injection voltages;

high-pass filters which extracts response current components $i_{hd\text{-}hp}, i_{hq\text{-}hp}$ related to the position of the rotor from the rotating-coordinate-system response currents $i_{hd}, i_{hq}$;

a fourth coordinate converter which converts the response current components $i_{hd\text{-}hp}, i_{hq\text{-}hp}$ related to the position of the rotor to stationary-coordinate-system response current components $i_{h\alpha}, i_{h\beta}$ using the gain-controlled rotating angle $\theta_h$;

a position error calculator which calculates the rotating-coordinate-system response current components $i_{h\alpha}, i_{h\beta}$ and an estimated rotor position $\tilde{\theta}$ based on the following equation to calculate a rotor position error (e) and;

a PI regulator which estimates the rotor speed $\tilde{\omega}$ through proportional integral of the rotor position error (e); and an integrator which integrates the estimated rotor speed $\tilde{\omega}$ to estimate the rotor position $\tilde{\theta}$, $$e = i_{h\alpha} \sin 2\tilde{\theta} - i_{h\beta} \cos 2\tilde{\theta}$$

$$i_{h\alpha} = -B \cos(2\theta),$$

$$i_{h\beta} = -B \sin(2\theta).$$

9. A device for controlling the startup of a motor according to a sensorless control scheme in which estimated position and speed of a rotor is used to control the motor, the device comprising:

a motor drive voltage generator which generates voltage to drive the motor;

a voltage injector which generates injection voltages for estimating an initial position of the rotor;

a current extractor which extracts response current components in respect to the injection voltages;

a position/speed estimator which estimates the position and speed of the rotor based on the response current components outputted from the current extractor; and a coordinate converter which converts three-phase currents detected upon rotation of the motor to rotating-coordinate-system currents using the estimated rotor position.

10. The device of claim 9, wherein the motor drive voltage generator comprises:

a reference torque current generator which generates a reference torque current for compensating an error caused by a difference between a reference speed and an estimated rotor speed;

a rotating-coordinate-system voltage generator which generates a reference torque voltage for compensating an error caused by a difference between the reference torque current and an actual torque current, and a reference flux voltage for compensating an error caused by a difference between a reference flux current and an actual flux current; and a motor drive voltage generator which converts a reference flux voltage inputted from the rotating-coordinate-system voltage generator and an injection voltage inputted from the voltage injector to three-phase motor drive voltages.

11. The device of claim 10, wherein the motor drive voltage generator comprises:

a second coordinate converter which converts a reference torque voltage and a reference flux voltage, which are inputted from the rotating-coordinate-system voltage generator, to stationary-coordinate-system voltages;

a plurality of adders each adding the stationary-coordinate-system voltages inputted from the second coordinate converter to the injection voltages inputted from the voltage injector; and a motor driving unit which converts stationary-coordinate-system voltages including the injection voltages inputted from the adders to the three-phase motor drive voltages.

12. The device of claim 9, wherein the voltage injector injects the injection voltages on a stationary coordinate system into the motor drive voltage generator and outputs a rotating angle in respect to the injection voltages to the position/speed estimator.

13. The device of claim 9, wherein the current extractor includes a bandpass filter which extracts current components in respect to the injection voltages.

14. The device of claim 9, wherein the position/speed estimator includes:
a third coordinate converter which converts the response current components in respect to the injection voltages inputted from the current extractor to rotating-coordinate-system response current components using a rotating angle of the rotor in respect to the injection voltages;
at least one high-pass filter which extracts response current components related to the rotor position from the rotating-coordinate-system response current components inputted from the third coordinate converter;
a fourth coordinate converter which converts the response current components related to the rotor position inputted from the high-pass filter to stationary-coordinate-system response current components using the gain-controlled rotating-angle inputted from the voltage injector;
a position error calculator which calculates the stationary-coordinate-system response current components inputted from the fourth coordinate converter and an estimated rotor position to calculate a rotor position error;
a PI regulator which calculates an estimated rotor speed through proportional integral of the rotor position error inputted from the position error calculator; and
an integrator which integrates the estimated rotor speed inputted from the PI regulator to calculate an estimated rotor position.

15. The device of claim 9, wherein the coordinate converter includes:
a three-phase/stationary coordinate converter which converts three-phase currents detected upon rotation of the motor to two-phase stationary-coordinate-system currents; and
a first coordinate converter which converts the two-phase stationary-coordinate-system currents inputted from the three-phase/stationary coordinate converter to the rotating-coordinate-system currents using the estimated rotor position inputted from the position/speed estimator.

16. The device of claim 15, wherein the first coordinate converter includes a notch filter to eliminate the current components in respect to the injection voltages from the two-phase stationary-coordinate-system currents inputted from the three-phase/stationary coordinate converter.

17. A method of controlling the startup of a motor according to a sensorless control scheme in which estimated position and speed of a rotor is used to control the motor, the method comprising the steps of:
a) injecting voltages to estimate an initial position of the rotor;
b) applying three-phase motor drive voltages including the injected voltages to the motor to drive the motor;
c) extracting response current components $i_{\alpha\text{-}inj}, i_{\beta\text{-}inj}$ in respect to the injected voltages from two-phase stationary-coordinate-system currents converted from three-phase currents detected upon rotation of the motor; and
d) calculating a rotor position error (e) by calculating response current components related to the rotor position extracted from the extracted response current components $i_{\alpha\text{-}inj}, i_{\beta\text{-}inj}$ and an estimated position $\tilde{\theta}$ fed back; and
e) estimating and outputting the speed and position $\tilde{\omega}, \tilde{\theta}$ of the rotor from the calculated rotor position error (e).

18. The method of claim 17, wherein the injected voltages are stationary-coordinate-system voltages which can be expressed in a $\alpha$-axis voltage and a $\beta$-axis voltage.

19. The method of claim 17, wherein the step d) comprises the steps of:
converting the response current components $i_{\alpha\text{-}inj}, i_{\beta\text{-}inj}$ in respect to the injected voltages to rotating-coordinate-system response current components $i_{hd}, i_{hq}$ using a rotating angle $\theta_h$ of the rotor in respect to the injected voltages;
extracting response current components $i_{hd\text{-}hp}, i_{hq\text{-}hp}$ related to the rotor position by filtering the rotating-coordinate-system response currents $i_{hd}, i_{hq}$;
converting the response current components $i_{hd\text{-}hp}, i_{hq\text{-}hp}$ related to the rotor position to stationary-coordinate-system response current components $i_{h\alpha}, i_{h\beta}$ using the gain-controlled rotating angle $\theta_h$; and
calculating the rotating-coordinate-system response current components $i_{h\alpha}, i_{h\beta}$ and an estimated rotor position $\tilde{\theta}$ based on the following equation to calculate a rotor position error (e), $$e = i_{h\alpha} \sin 2\tilde{\theta} - i_{h\beta} \cos 2\tilde{\theta}$$

$$i_{h\alpha} = -B \cos(2\theta),$$

$$i_{h\beta} = -B \sin(2\theta).$$

* * * * *